United States Patent [19]
Koopman, Jr.

[11] Patent Number: 5,757,923
[45] Date of Patent: *May 26, 1998

[54] METHOD OF GENERATING SECRET IDENTIFICATION NUMBERS

[75] Inventor: Philip J. Koopman, Jr., Hebron, Conn.

[73] Assignee: UT Automotive Dearborn, Inc., Dearborn, Mich.

[*] Notice: The term of this patent shall not extend beyond the expiration date of Pat. No. 5,696,828.

[21] Appl. No.: 635,145

[22] Filed: Apr. 19, 1996

Related U.S. Application Data

[63] Continuation-in-part of Ser. No. 532,337, Sep. 22, 1995, Pat. No. 5,696,828.

[51] Int. Cl.⁶ .................................................. H04L 9/00
[52] U.S. Cl. .................................................. 380/46; 364/717
[58] Field of Search ............................ 380/46; 364/717

[56] References Cited

U.S. PATENT DOCUMENTS

| | | |
|---|---|---|
| 4,424,414 | 1/1984 | Hellman et al. |
| 4,853,884 | 8/1989 | Brown et al. |
| 5,048,086 | 9/1991 | Bianco et al. |
| 5,363,448 | 11/1994 | Koopman, Jr. et al. |
| 5,398,284 | 3/1995 | Koopman, Jr. et al. |
| 5,434,806 | 7/1995 | Hofverberg |

*Primary Examiner*—David C. Cain
*Attorney, Agent, or Firm*—Ozer M. N. Teitelbaum

[57] ABSTRACT

The present invention teaches a method of generating a secret identification number from a random digital data stream. The method comprises the step of initially selecting a first and a second group of bytes from the random digital data stream, wherein the first and second groups of bytes have a first and second numerical value. Subsequently, a first maximal length LFSR feedback term is looked up from a list in response to said first numerical value, while a second maximal length LFSR feedback term is looked up from the list in response to said second numerical value. The method additionally comprises the step of generating a cyclic redundancy code feedback term in response to executing a cyclic redundancy code check on a third group of bytes selected from the random digital data stream. Moreover, the method comprises the step of forming the secret identification number from the first and second maximal length LFSR feedback terms, the cyclic redundancy code feedback term, and a fourth group of bytes from the random digital data stream.

30 Claims, 4 Drawing Sheets

FIG.4

METHOD OF GENERATING SECRET IDENTIFICATION NUMBERS

RELATED APPLICATIONS

This application is a continuation in part of an application (Ser. No. 08/532,337) filed on Sep. 22, 1995, commonly assigned with the present invention, now U.S. Pat. No. 5,696,828.

FIELD OF THE INVENTION

The present invention relates to cryptography, and more particularly to a method of generating secret identification numbers.

BACKGROUND OF THE INVENTION

Pseudo-random number generators are well known in the cryptographic sciences. Cryptography is defined as the art and science of preventing eavesdroppers from understanding the meaning of intercepted messages. In such security minded applications, pseudo-random as well as truly random number generators may be used to support the encryption and decryption of information. These number generators are primarily employed to generate "secret keys" for use in cryptographic encoding and decoding of information.

Within the application of a number generator for creating secret keys, a set of secret numbers is used as a cryptographic key for encoding and/or decoding messages. It is vitally important that this key not be known by unauthorized parties, nor discernible via cryptanalysis based on knowledge of messages. Thus, it is desirable to generate a sequence of apparently random numbers in order to manufacture a plurality of secret keys. An "apparently random" number is definable as a number within a sequence or progression of successive numbers having a value which is neither practically reconstructible nor may the set of possible values of that particular number be substantially narrowed, even when given (1) copies of the generator algorithms; (2) non-invasive access to the equipment while generating the numbers; and (3) a complete list of all other numbers in the sequence.

An inexpensive manufacturing process for secret keys poses special requirements on generating apparently random numbers. In particular, only widely available off-the-shelf equipment may be used in order to minimize procurement, maintenance, and repair costs. Further, the sequence of numbers used to create the secret keys must not be reproducible, even by the manufacturer while in full possession of all equipment and algorithms used in the process. Moreover, there must be a guarantee of no duplicate secret keys ever being generated and, at the same time, no record of the actual key values may be retained by the manufacturer.

Traditionally, pseudo random number generators have been the means of choice in low security applications. Pseudo-random number generators produce a sequence of apparently random numbers utilizing a deterministic algorithm, and assume that any potential unauthorized party has neither access to nor desire to discover the generating algorithm.

Pseudo-random numbers serve as an approximation to truly random numbers for a limited set of purposes. Traditional pseudo-random number generators are implemented using linear feedback shift registers or linear congruential generators using either hardware or software. Given the algorithm and current state, such as the contents of a hardware register or values of computer software variables, the output of a pseudo-random number generator may be exactly replicated. As this state information may be inferred from a one or more values within the number sequence, traditional pseudo-random number generators have substantial limitations.

Cryptographically secure pseudo-random number generators are special pseudo-random number generators designed to resist attempts to determine the current state of the generated random number stream through analysis. These systems typically assume that unauthorized parties have complete access to the algorithm, though not to the current state values. Such generators are, however, still deterministic. As such, in the event the current state is breached by cryptanalysis or other method, all numbers created by the generator in the future—and, in many designs, the past—may be deduced. Typically, in these systems, it is assumed that the legitimate owner of the generator may be trusted not to reveal or exploit knowledge of the current generator state. However, a defecting employee or industrial espionage may compromise a cryptographically secure generator. Thus, these generators also have substantial disadvantages.

Alternatively, a "truly random" sequence of numbers may be defined as one in which there is a theoretical basis for stating that the next number in the sequence cannot be predicted using either a mathematical or scientific method given an arbitrarily long history of the sequence behavior. In particular, a truly random number provide absolutely no pattern, correlation, or dependency among the remaining numbers in a sequence of numbers other than chance patterns. Generation of truly random sequences typically requires physical measurement of quantum mechanical uncertainty, such as, for example, radioactive decay. While truly random numbers may be employed for use as apparently random numbers, relevant measurement equipment is presently not commerically available for such purposes. It should be noted that even using physical measurement of quantum mechanical uncertainty to generate truly random sequences does not guarantee against sub-sequences of random numbers repeating and thus generating duplicate secret keys.

A further known approach to generating truly random numbers relies on chaos theory. Here, chaotically generated numbers are created by repeated experimental trials using a chaotic system with quantized outcomes, such as coin tossing or rolling dice. In a chaotic system, outcomes vary greatly and non-linearly according to minute variations of initial experimental conditions. Therefore small sources of experimental error that are inevitably present in the physical world are magnified, thereby making it impractical to correlate system outputs, or numbers, with available measurements of system inputs, such as initial conditions. Generating large volumes of chaotic experimental results has in the past, however, required special purpose hardware, such as for example a nonlinear oscillator, which is not readily available. Furthermore, there is no guarantee against unintentionally repeating generated secret key values.

Using deterministic mathematical algorithms that compute simulations of chaotic systems has been proposed as a scheme for generating apparently random numbers. Because such simulations are computed using exactly specified numbers representing initial conditions, the source of apparent randomness due to minute variation of initial conditions is lost when performing simulations instead of physical experiments. These approaches are deterministic and therefore vulnerable and also subject to attack and compromise if the particular chaotic formula being used becomes known— such as for example by examining the relevant patent—or deduced by cryptanalysis. Similarly, pseudo-random number generators are based on algorithmic recursion formulas are subject to compromise.

Strategies employed in pseudo-random number generator designs have often relied upon specialized digital hardware. One such method uses a linear feedback shift register ("LFSR") for obtaining an n-bit pseudo random number by serially shifting out bits from the shift register or shift register chain during a substantially long period outside the purview of potential eavesdroppers. For example, a sixty four (64) bit maximal length LFSR running at a clocked frequency of 1 MHZ could be sampled every few seconds to approximate a random number stream. In such an example, the random number stream will not be repeated for 585,000 years. However, this LFSR approach is still deterministic. As such, all future and past states are predictable when the present state of the shift register is known. For example, purchase and reverse-engineering of a single manufactured unit to determine its secret key value would allow intelligent guessing of the values of other units manufactured in the same or proximate batches.

As a result of the hereinabove shortcomings and in view of the growth of cryptographic applications, a demand exists for a random number generator which is not deterministic, implementable with commonly available equipment, and which will not generate duplicate secret keys. A need further exists for such a random number generator from which results cannot be duplicated, even by the designer or secret key manufacturer.

DISCLOSURE OF THE INVENTION

The primary advantage of the present invention is to overcome the limitations of the prior art.

Another advantage of the present invention is to provide a method and system for generating a number stream that, using the most advanced cryptanalytic and statistical methods available, is indistinguishable from a truly random number stream.

Another advantage of the present invention is to provide a method and system for generating random numbers which is non-deterministic.

Another advantage of the present invention is to provide a method and system for guaranteeing that no particular sub-sequence of random numbers or derivative value is used twice while at the same time eliminating vulnerabilities normally associated with keeping records of values generated.

A further advantage of the present invention is to provide a method and system for generating random numbers which is immune to attack and compromise, even from the manufacturer of the random numbers.

Yet another advantage of the present invention is to provide a method and system for generating random numbers which utilizes the apparently random nature of chaotic systems generally.

In order to achieve the advantages of the present invention, a method of generating secret identification numbers from a random digital data stream is disclosed. The method comprises the step of initially selecting a first and a second group of bytes from the random digital data stream, wherein the first and second groups of bytes have a first and second numerical value. Subsequently, a first maximal length LFSR feedback term is looked up from a list in response to said first numerical value. The method additionally comprises the step of generating a cyclic redundancy code feedback term in response to filtering out predetermined values from a third group of bytes selected from the random digital data stream. Moreover, the method comprises the step of forming the secret identification number from the first maximal length LFSR feedback term, the cyclic redundancy code feedback term, and a fourth group of bytes from the random digital data stream.

Moreover, a method is disclosed for generating a plurality of random numbers. The method comprises the initial step of generating chaotic noise. Subsequently, the chaotic noise is sampled and converted to digital data such that a random number is generated responsive to the sampled value. A refinement of the method further processes the digital data by reordering, compressing, and hashing a plurality of samples in order to create a plurality of random numbers. A further refinement of the method retains digests of generated values in order to provide absolute guarantees that value sequences of a predetermined length are never duplicated.

Additionally, a system of generating a plurality of random numbers is also disclosed. The system comprises a chaotic noise generator for generating chaotic noise, and a recording device for sampling the chaotic noise such that a plurality of samples are created. Moreover, a digitizer is incorporated for converting each sample of the plurality into digital data such that random numbers are generated responsive to the sample values. A processing element is used to process the data in order to provide optimally random values. Additionally, a table containing digests of previously generated values is provided in order to filter out potential duplicate value sub-sequences.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE INVENTION

Figure 1:
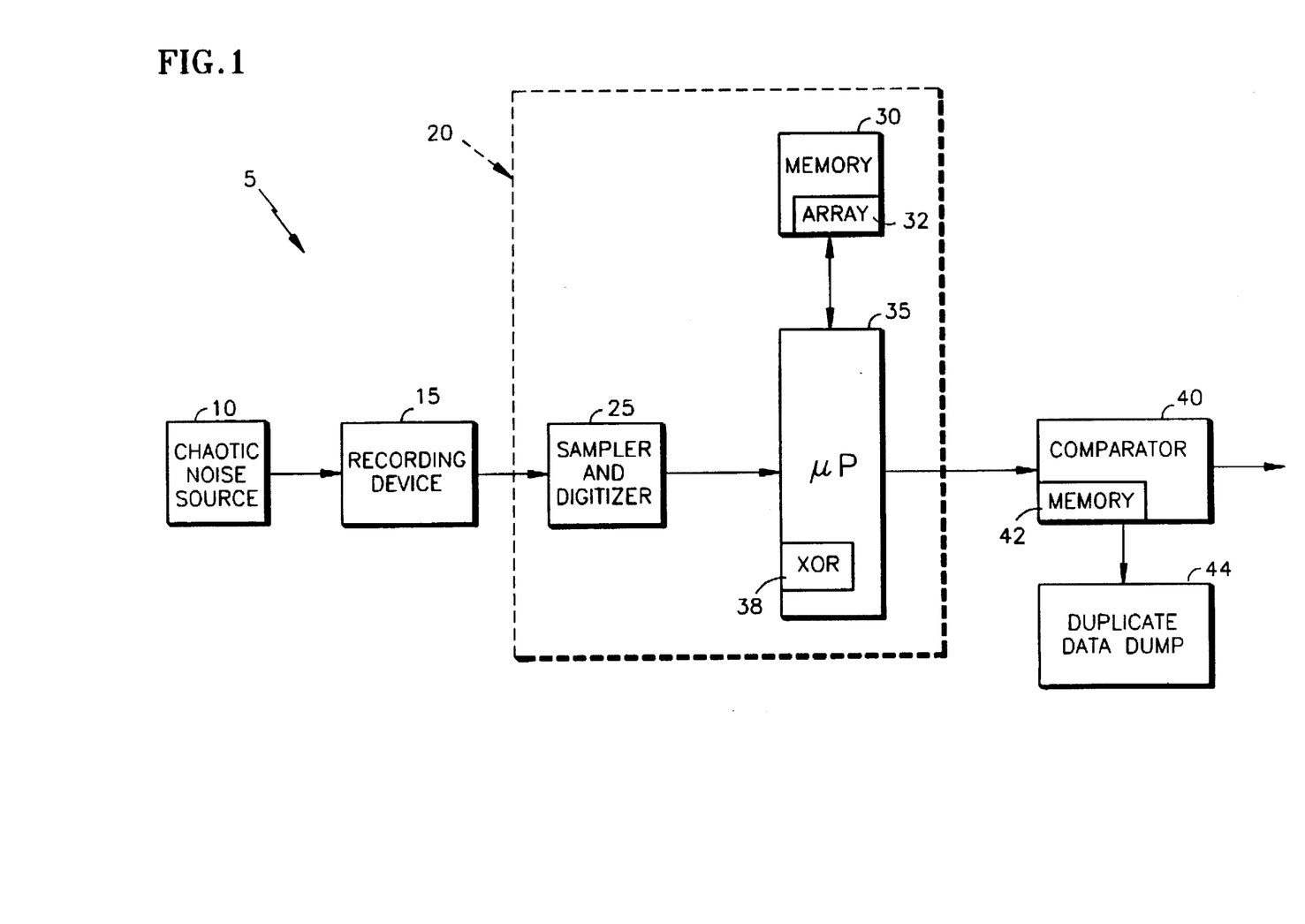
FIG. 1 illustrates a block diagram of the preferred embodiment the present invention.

Referring to FIG. 1, a block diagram of the preferred embodiment of the present invention is illustrated depicting a system 5 for generating a plurality for random numbers. It should be noted that for the purposes of the present disclosure the phrase "random numbers" refers to "apparently"

random numbers. Moreover, as will become evident upon understanding the present disclosure, and the preferred embodiment particularly, system 5 generates a random sequence of secret identification numbers, hereinafter referred to as IDs. In the preferred embodiment, each ID is associated with a fob of a remote keyless entry system. To improve and ensure the security of such an entry system, cryptography is incorporated to substantially restrict the opportunity to compromise any random ID generated by system 5.

System 5 comprises a chaotic noise source 10 for generating chaotic noise to realize the aim of generating random IDs. In one embodiment of the present invention, chaotic noise source 10 comprises an electromechanical generator for generating turbulent air flow. Turbulent air flow exhibits characteristics that may be classified as randomly occurring in nature, as opposed to those elements having a pseudo randomness resulting from simulated chaos created by deterministic mathematics. In the preferred embodiment of the present invention, the turbulent air flow output of the chaotic noise generator 10 is generated by a small, high-air-volume, generically "noisy" fan because it provides turbulent air flow and thus creates noise that is inherently chaotic. It should be apparent that a spectrally pure noise source, such as a pure sinusoidal tone, is highly undesirable.

System 5 further comprises a recording device 15 for capturing the chaotic noise according to the unique spatial perspective of the recording device 15. Recording device 15 records the chaotic noise output generated by chaotic noise source 10, as well as the ambient noise and any other extraneous sounds, such as fan motor noise, uniquely present at its particular spatial coordinates. In the preferred embodiment, recording device 15 comprises a microphone positioned in reasonably proximate distance to the chaotic noise source 10 for recording the air flow around the microphone. It should be apparent to one of ordinary skill in the art that the relevant amplitudes of the sounds and noises recorded by recording device 15 when combined with self-noise from turbulent air flow over and around recording device 15, are unique, and as such, may not be reproduced as the coordinates of the device 15 are inhabited by only one spatial element.

Once the chaotic noise generated by source 10 is recorded by device 15, the resultant recorded sound is fed into a computer 20, and more particularly sampler and digitizer 25. Sampler and digitizer 25 performs two functions. First, sampler and digitizer 25 samples the sound recorded by recording device 15 at an interval responsive to the computing speed of the microprocessor 35. In the preferred embodiment, the interval varies due to timing variations inherent in software execution but is always longer than the period of the fundamental frequency of dominant noise elements in the chaotic noise source 10. An example of such a scenario is where the sampling interval is slower than the time required for one rotation of the fan generating the turbulent chaotic noise.

Sampler and digitizer 25 generates a plurality of samples responsive to the sampled chaotic noise. Each sample is then digitized by an analog to digital converter, such that each sample is converted into a digital data set, which in one embodiment comprises 8 bits. In the preferred embodiment of the present invention, both functions of sampler and digitizer 25 are realized by a personal computer ("PC") sound card, such as for example the Sound Blaster® SBPro sound card.

Figure 2:
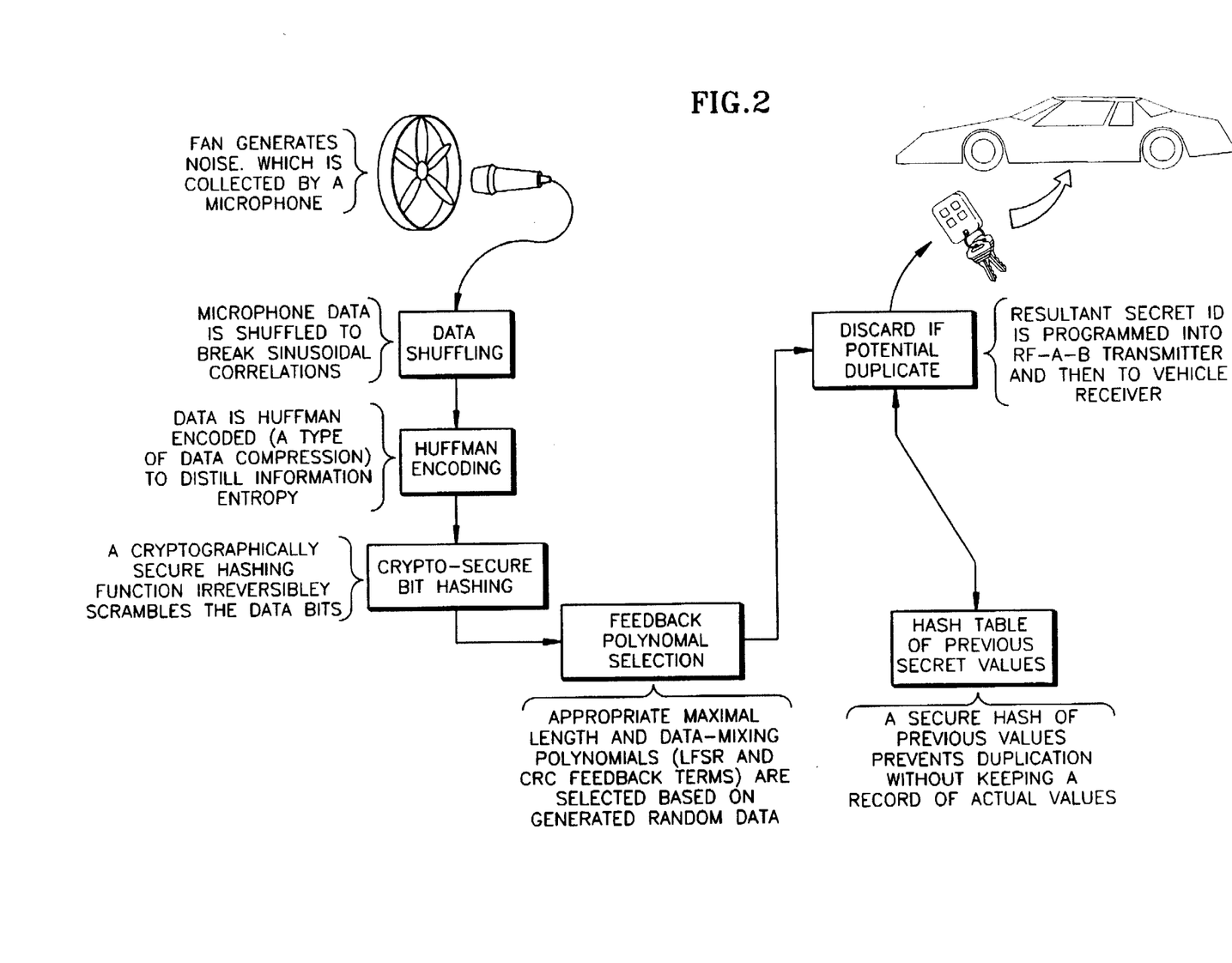
FIG. 2 illustrates a high-level overview flow chart of the preferred embodiment the present invention.

Moreover, system 5 additionally comprises a microprocessor or microcontroller 35, and a memory 30. Microprocessor 35 performs a series of algorithmic functions stored in memory 30 for obscuring the generated random numbers, and for ensuring the randomness of the random numbers generated. As a result of performing these algorithmic functions, a random number output is generated. An overview of the algorithmic functions performed is provided in FIG. 2.

Figure 3:
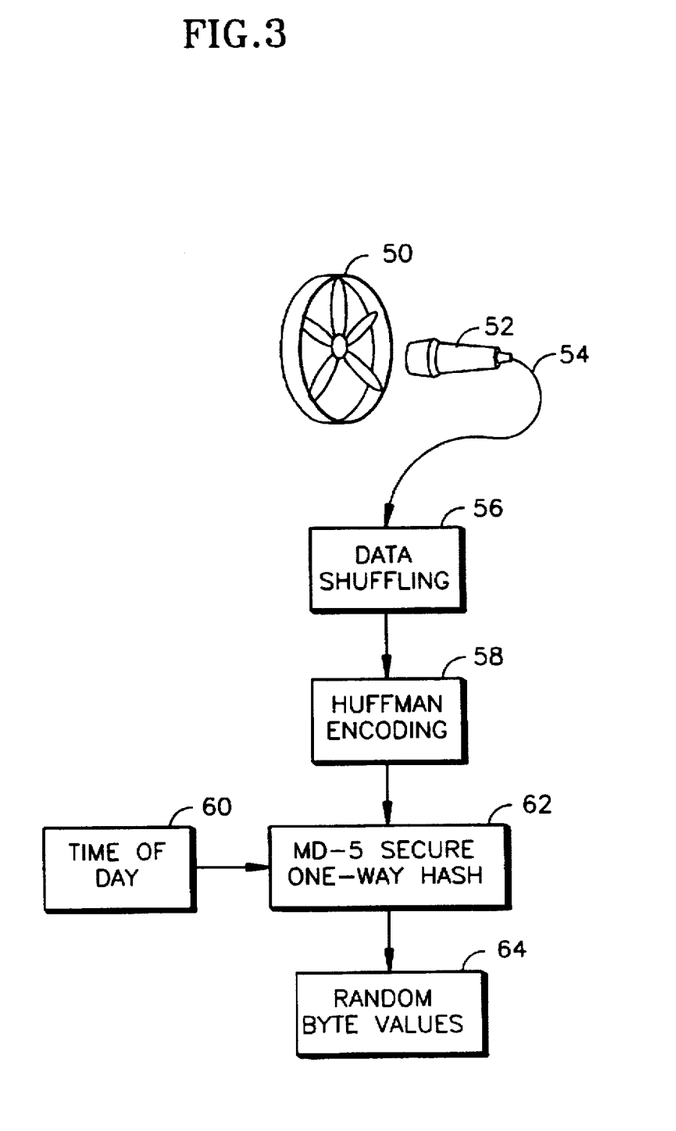
FIG. 3 illustrates a more detailed flow chart of the first several steps of the preferred embodiment of the present invention.

Referring to FIG. 3, a detailed flow chart for generating a stream of apparently random numbers according to the preferred embodiment of the present invention is illustrated. It should be noted that the crux of the manufacturing process of FIG. 3 is to illustrate an inexpensive method for creating a stream or sequence of random numbers. The present invention concentrates on the application of generating apparently random numbers for "secret key" creation, also with the understanding that the discussion applies equally to generating any stream of apparently random numbers, such as that used by one-time pad/Vernam cipher encryption techniques or for Monte Carlo computer simulations.

The first function performed by microprocessor 35 is the algorithmic step of shuffling each data set. Upon receiving a digital data set of each converted sample, microprocessor 35 positions the digital data set into a data array 32. In the preferred embodiment, array 32 is realized by a disk drive. However, array 32 may be realized as a portion of memory 30 so as to cover an application that leaves it in RAM. Nonetheless, rather than simply place samples in adjacent array locations, an access stride with wraparound is used to place sequential samples into array 32.

It is important to note the reasoning behind not putting sequential samples in adjacent array locations is as follows. If, for example, a sinusoidal input signal is sampled much more quickly than the frequency of the sinusoid, sequential samples will have similar and readily predictable values because the input signal changes relatively slowly compared to the sampling rate. While it is desirable to sample slowly enough that this does not happen, in a practical commercial system the demand for high data acquisition rates may require fast enough sampling that this problem must be resolved in another way. In the preferred embodiment, fast sampling is permitted, but the data from sequential samples is dispersed in a data array in order. This dispersion helps obscure data correlations between successive samples by spreading the information out. It also facilitates mixing of data samples from widely different times in later steps, because the mixing is performed on blocks of adjacent samples.

In the preferred embodiment, an 8 Kbyte array 32 is used for data samples. A stride of 89 is used for storing elements—in other words, each element is stored 89 array locations past the previous element, modulo 8192. 89 was picked as a prime number approximately equal to the square root of 8192. Selecting a stride relatively prime to the array size guarantees that the strided access will touch every location within the array before repeating.

It is also preferred that the dominant harmonics of the chaotic noise source 10 be distinct from the frequency at which the address for filling array 32 wraps around. In the preferred embodiment with a stride of 89, this means that the sampling rate should be such that complete sinusoids of any strong harmonic do not fit or almost fit in a multiple of 92 samples–8192 array elements divided by a stride of 89 equals approximately 92 strided accesses before wraparound occurs. If this preferred characteristic is not provided, then it could result in adjacent samples in the array having similar values sampled from similar places on a generally periodic, although chaotically varying waveform.

Additionally, microprocessor 35 performs the algorithmic step of compressing each data set in order to "distill" the chaotic noise content. The portion of the theoretical information content, or entropy, in the data stream is generally less than the number of raw data bits associated with each data bit set. By compressing the data bits associated with each data bit set, the information content is "squeezed" into a smaller space by transforming the raw data stream into a data stream that is closer in size to the theoretical minimum based on information entropy. The average entropy of each bit after compression is higher than the entropy per bit before compression. Because a higher amount of entropy per bit better approximates true randomness, this compression step hampers crypt analysts attempting to perform statistical analysis on the sampled data.

In the preferred embodiment, each digital data set of 8 Kbytes has been shuffled prior to executing the compression step. By performing compression on each digital data set, each number in the resultant compressed data set is better approximation to apparently random numbers than the raw samples. Various compression techniques are known to one of ordinary skill in the art, such as PKZIP compression software and UNIX compression software, though Huffman encoding is preferred for this application due to its simplicity.

Huffman encoding entails a byte by byte compression technique wherein the number of occurrences in the 8 Kbyte data input set of byte values from 0 to 255 is tallied. Each byte value is assigned a bit string, with shorter strings assigned to more frequent byte values. In the event all 256 values of the 8 bit input occur with equal probability, the data is unaffected. However, as is much more likely the case, in the event that the probability distribution of inputs is nonuniform, the Huffman encoding process substitutes a sequence of varying length bit streams for the array of byte values. It should be apparent to one of ordinary skill in the art that as the lengths of the bit strings vary in relation with the input byte probability distribution, numerous output byte values exist irrespective of the repetition of the sequence of input byte values due to undesirable correlations. As such, Huffman encoding is the preferred compression technique. It should be noted that in the general case Huffman encoding or any other off the shelf compression technology will not provide perfect compression for all possible input data sets—i.e., will not result in an entropy of one bit of theoretical information content per bit of resultant values—but will in most practical cases substantially compress the data.

A third algorithmic step performed by microprocessor 35 is one way encrypting the data set. Because compression will in general not give perfectly random results, a further step is needed to foil potential attacks by crypt analysts. To insure against compromise by prediction techniques, each compressed sample is one way encrypted. The step of one way encryption is performed for two essential reasons. First, encrypting the input bits insures the randomness of the resultant numbers generated by system 5. Second, performing a one way encryption step frustrates attempts to sample the random data stream for extrapolating other generated values based on attempts to model fan noise.

In the preferred embodiment, the one way encryption technique of choice is MD-5. This selection is based on several factors, including the fact that MD-5 is a one way hash function with no cryptographic key requirements. MD-5 is inherently irreversible because it reduces a 64 byte input array to a 16 byte output array, making brute force attacks based on guessing inputs impractical—any given output could have been generated by $4 \times 10^{115}$ separate inputs. Additionally, the fact that MD-5 works on 64 byte input blocks permits mixing of sampled data from many non-sequential samples from the strided filling of the input array 32. As such, recovery of the original data stream is made impossible, even by the original encryptor. Moreover, MD-5 comprises a uniformly distributed probability of output bit values when given inputs with essentially any set of varying input values. It should be apparent, however, that the MD-5 approach may replaced by various other encryption methods in view of the instant disclosure, including MD-2 encryption, MD-4 encryption, SHA encryption, SNEFRU encryption, or even simply Exclusive OR-ing a plurality of input byte values to form each output byte value as well as other techniques apparent to one of ordinary skill in the art in view of the present invention.

To further ensure the randomness of the numbers generated by system 5, in an alternate embodiment of the present invention, an additional algorithmic step is performed by microprocessor 35. Here, a portion of each compressed sample preferably, or in the alternative a portion of each data set are input to a logical exclusive OR ("XOR") gate 38 simultaneously with an independently varying, guaranteed non-repeating value, preferably the date and time of day. The output of the XOR is then one way encrypted algorithmic step by microprocessor 35. In so doing, some variation is instituted in the input of the one way encryption algorithm in the event an unintentionally repetitive data input exists. As a point of illustration, it should be apparent to one of ordinary skill in the art that simply running the time of day or a counter output through an MD-5 encryption scheme would be vulnerable to attack by someone who knows the process and guesses the time of day while looking for a matching output. However, Exclusive OR-ing the time of day with approximately random values effectively obscures the information and makes guessing the input to the encryption algorithm impracticable.

As a result of the hereinabove algorithmic steps, a one way encrypted random number output is generated by computer 20, and more particularly microprocessor 35. This output is comprises a stream of random byte values 64. Each random byte value comprises a uniform probability of distribution with respect to a predetermined range.

Figure 4:
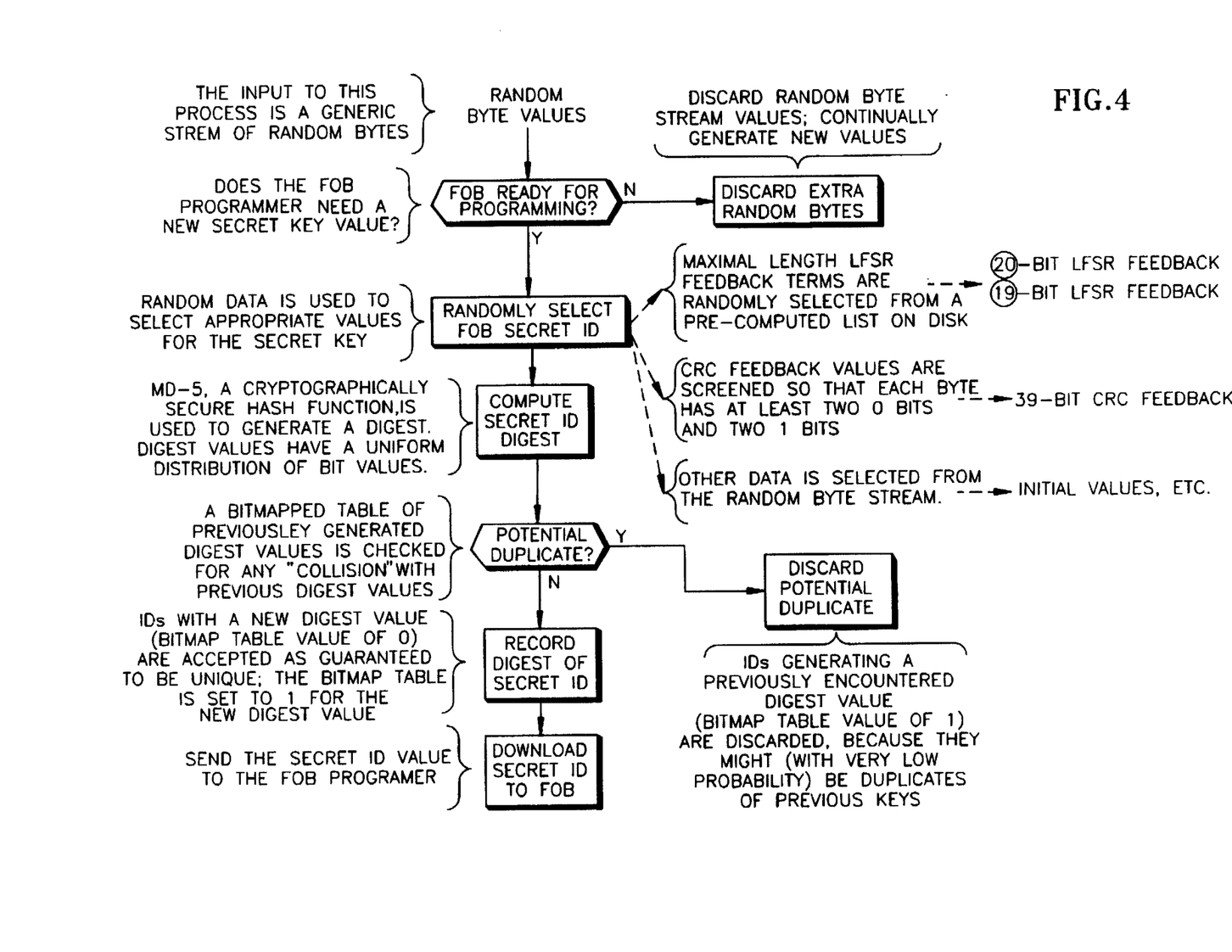
FIG. 4 illustrates a more detailed flow chart of the remaining steps of the preferred embodiment of the present invention.

Referring to FIG. 4, a flow chart of a method for converting the random byte values 64 into ID values is illustrated. With a stream of random byte values generated, several additional steps may be performed to realize a secret identification value. This is of particular significance where a secret number is required to uniquely identify a particular object, such as a keyless entry fob in the preferred embodiment, or a cellular phone for example.

The first step performed on the stream of random byte values involves a determination as to whether a secret identification number is needed. This is particularly of note in the preferred embodiment where fob transmitters are manufactured as part of a remote control keyless entry systems. Here, the fob programmer examines the present need for a secret identification number for downloading during production. In the event a secret identification number is not needed, the random byte stream is discarded while new values are continuously generated. Discarding bytes when the programmer is idle further complicates cryptanalysis by making the number of discarded bytes responsive to the varying interval between fob programming events.

However, when a secret identification number is required, the random byte values generated are used as a basis for creating the number. Because the actual numbers used within the secret ID must satisfy certain predetermined properties, the raw random byte values are not used as the secret ID value itself. Rather, the secret ID is created in response to the random byte values as described herein. As such, the secret IDs are themselves randomly generated— i.e., any particular secret ID cannot be predicted even given complete information about all other secret IDs generated. The values that comprise the generated secret ID fall within three categories: linear feedback shift register ("LFSR"), cyclic redundancy code ("CRC"), and other values.

The LFSR values are selected to correspond with maximal length feedback polynomials. These are feedback terms that, when used in an LFSR, produce sequences that cycle through all possible values except zero before repeating. Selection of a 20 bit and a 19 bit feedback term, as detailed in U.S. Pat. No. 5,363,448, commonly assigned with the present invention is accomplished by using the random byte stream to randomly select an entry in a file with precomputed maximal length LFSR feedback terms.

The CRC feedback value for the secret ID is selected to correspond to a feedback polynomial that has a mixture of one and zero bits. The preferred criteria is that random bytes are employed for the feedback terms, but bytes having fewer than two "one" bits or fewer than two "zero" bits are discarded. Thus, each byte of the 39 bit CRC feedback polynomials is guaranteed to have no more than 6 bits of the same value. Of course, the top polynomial bit is forced to '1' while the bit above that is set to '0' in view of the fact that the 39 bit polynomial is contained in a 40 bit set of bytes. Given that some byte values are discarded, there are $[(238^5)/4]$ or 190,908,292,792 possible values for the CRC feedback term, wherein the 5 represents the number of bytes with 238 possible values each, and the four corresponds with the number of constant values of the top two bits.

As for the third category, the other secret identification values are selected by simply using the random byte stream values. In the case of initial LFSR seed values, a non-zero random value is required, rejecting all zeros.

Thus, the feedback term of a maximal length linear feedback shift register ("LFSR") is randomly selected from a pre-computed list in a memory device. This results in a 20 bit LFSR feedback and 19 bit LFSR feedback arrangement, although other sized LFSRs could be readily accommodated.

Moreover, a cyclic redundancy checking ("CRC") device subsequently screens feedback values using a 39 bit CRC feedback configuration such that each byte has at a least two logical 0 bits and two logical 1 bits. The remainder of the process involves selecting other data from the random byte stream as initial values. As a result, the output generated is a candidate 128 bit secret identification number. Prior to acceptance, it must be demonstrated to be unique with respect to all previously generated secret identification values.

In still a further embodiment of the present invention, duplicate secret ID values are suppressed without keeping precise records of secret ID values previously generated. Duplicate ID values would cause problems in that they would result in issuing two fobs with identical cryptographic keys. In order to provide a guarantee of uniqueness, each ID value generated must be compared against all previously generated values. However, keeping a list of previously generated values represents a security vulnerability in that such a list is subject to theft or other compromise. Thus, the further embodiment of the present invention keeps a digest or condensed version of generated IDs in order to guarantee uniqueness without compromising security.

Detection and elimination of accidentally duplicated results in the output of computer 20 is performed by means of a comparator 40 for comparing each output with all previous outputs. While in the preferred embodiment these outputs are secret IDs, it will be apparent to one of ordinary skill in the art that the following techniques could be applied to any data set comprising a plurality of bits that must be kept secure, yet be guaranteed unique.

To effectively perform this function of guaranteeing uniqueness, comparator 40 comprises a memory 42 for storing a digest of each secret ID generated. Further, in the preferred embodiment, duplicates are simply ignored. However, in an a alternate embodiment, a discarding device or duplicate data dump 44 is incorporated for discarding duplicates in the plurality of encrypted random numbers.

The comparator 40 and memory 42 operate as follows. As the first step of maintaining the uniqueness of all secret identification numbers, a secure digest of the candidate secret identification number is computed. In the preferred embodiment, this digest comprises a 32 bit number that is deterministically computed from the 128 bit identification number in such a way as to ensure knowledge of the 32 bit digest does not reveal any useful information about the original secret identification number. Each secret identification number corresponds to one and only one digest value. Therefore, ensuring that no two secret ID numbers having identical digest values are ever issued guarantees that no two identical secret ID numbers are issued. And as a very large number of distinct secret identification numbers formulate the same digest value, it is thus difficult to infer which secret identification number caused any particular digest value to be generated.

The secret identification digest may be realized by performing a cryptographically secure hash function. While the MD-5 encryption method is the preferable choice, MD-2, MD-4, SHA, SNEFRU encryption processes, as well as other techniques apparent to one of ordinary skill in the art in view of the present invention may also be employed. The 16 byte identification value is padded with zeros to form a 64 byte input. MD-5 then computes a 128-bit result that is treated as four 32 bit words which are XORed together to form a 32 bit resultant digest value. This resultant digest value is uniformly distributed over the range of a 32 bit values.

As result of computing a secret identification digest, according to the preferred embodiment, a bitmapped table of previously generated digest values is checked for duplicates. It should be noted that the probability of an actual duplicate is vanishingly small. With no "twiddle factor"—defined as the value of bit pattern 26 in U.S. Pat. No. 5,398,284—the possible number of combinations equal the product of the number (256) of ID byte values, the count number (255) of LFSR initializer values, the count number (2048) of LFSR feedback values, the identification number (8,355,840) of LFSR initializer values, the identification number (356,960) of LFSR feedback values, and the number (190,908,292, 792) of CRC feedback values, or $7.61 \times 10^{31}$ possible valid identification numbers.

For randomly generating values, an approximation to the expected number of identification numbers for which a single duplicate will be generated is approximately $(2V)^{1/2}$, where V is the total number of possible of identification numbers. As $7.61 \times 10^{31}$ possible valid identification numbers exist, one duplicate is expected to be generated for every $(2 \times (7.61 \times 10^{31}))^{1/2} = 1.23 \times 10^{16}$ secret identification numbers manufactured. Thus, where an identification number is generated once per second, one duplicate will be generated every 390 million years.

However, human errors, hardware failures, software bugs, and mechanical failures must also be considered. Thus, a duplicate checking function is performed. By checking for duplicates, a "collision" with previous digest values may be detected and discarded to insure against the possibility that two secret identification numbers are generated. This is realized by first comparing the digest value with a list of all previously generated digest values. Subsequently, new secret identification numbers having duplicate digest values are discarded. As such, identification numbers generating a previously encountered digest value having a bitmapped table value of 1 are discarded.

With potential duplicates discarded, an accepted identification number is input with a new digest value having a bitmap table value of 0. This unique resultant identification number then causes the bitmap table for the new digest value to be set to 1, indicating that the new identification number has been issued. After doing so, the programmer may transfer the secret identification number to the object requiring a secret number.

Using the above process, a resultant secret identification number may be programmed into a fob transmitter in a remote keyless entry vehicular system. Once residing within the fob transmitter, a base receiver of the remote keyless entry vehicular system may be programmed with the secret identification number. By this arrangement, the secret identification number is transmitted by means of the computer only a single time to insure against compromise as is well known in the art.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, while detailed for use in remote keyless entry systems for automobiles and other vehicles, it should also be apparent to one of ordinary skill in the art that the present invention is also applicable to others remote systems requiring security, generally, as well as RFID tags, garage door openers, cellular phones and remote computer access systems, more specifically. It is therefore contemplated that the appended claims will cover any such modifications or embodiments as fall within the true scope of the invention.

All of the U.S. Patents cited herein are hereby incorporated by reference as if set forth in their entirety.

We claim:

1. A method of generating a secret identification number from a random digital data stream, the method comprising the steps of:

selecting a first group of bytes from the random digital data stream, said first group of bytes having a first numerical value;

looking up a first maximal length LFSR feedback term from a list in response to said first numerical value;

generating a cyclic redundancy code feedback term in response to filtering out predetermined values from a third group of bytes selected from said random digital data stream; and forming the secret identification number from said first maximal length LFSR feedback term, said cyclic redundancy code feedback term, and a fourth group of bytes from said random digital data stream.

2. The method of generating a secret identification number from a random digital data stream of claim 1, wherein said step of generating a cyclic redundancy code feedback term comprises the steps of:

examining whether said cyclic redundancy code feedback term comprises less than two "0" bits or "1" bits; and generating a replacement feedback term for said cyclic redundancy code feedback term if said cyclic redundancy code feedback term comprises less than two "0" bits or "1" bits.

3. The method of generating a secret identification number from a random digital data stream of claim 1, further comprising the steps of:

selecting a second group of bytes from the random digital data stream, said second group of bytes having a second numerical value; and looking up a second maximal length LFSR feedback term from a list in response to said second numerical value such that said secret identification number is formed from said first and second maximal length LFSR feedback terma, said cyclic redundancy code feedback term, and a fourth group of bytes from said random digital data stream.

4. The method of generating a secret identification number from a random digital data stream of claim 3, further comprising the steps of:

repeating the steps of randomly selecting a first and a second group of bytes, looking up a first maximal length LFSR feedback term, looking up a second maximal length LFSR feedback term, generating a cyclic redundancy code feedback term, N times to create N secret identification numbers;

one way encrypting each of said N secret identification numbers;

computing a secure digest for each one way encrypted secret identification number of said N secret identification numbers;

comparing each one way encrypted secret identification number of said N secret identification numbers with each other one way encrypted secret identification number of said N secret identification numbers within said digest; and discarding each one way encrypted secret identification number of said multiplicity within said digest when two identical compressed one way encrypted secret identification number are discovered.

5. A method for generating a multiplicity of random numbers, the method comprising the steps of:

generating chaotic noise;

sampling said chaotic noise such that a plurality of samples are created;

converting said plurality of samples into a random digital data stream; and forming the multiplicity of random numbers from said random digital data stream.

6. The method for generating a multiplicity of random numbers of claim 5, wherein said step of forming the multiplicity of random numbers comprises:

shuffling said plurality of converted samples to obscure correlations between the multiplicity of random numbers.

7. The method for generating a multiplicity of random numbers of claim 5, wherein said step of forming the multiplicity of random numbers comprises:

compressing said plurality of converted samples such that each random number of the multiplicity has an equal probability of being generated.

8. The method for generating a multiplicity of random numbers of claim 5, wherein said step of forming the multiplicity of random numbers comprises:

one way encrypting said plurality of converted samples to prevent sampling the random digital data stream for extrapolating other generated values based on modeling said generated chaotic noise.

9. The method for generating a multiplicity of random numbers of claim 8, further comprising the step of:

examining said one way encrypted plurality of converted samples for duplicate converted samples; and discarding said duplicate one way encrypted converted samples.

10. The method for generating a multiplicity of random numbers of claim 8, further comprising the step of:

exclusively ORing an independent perspective marker with said compressed plurality of converted samples to insure the randomness of the multiplicity of random numbers.

11. The method for generating a multiplicity of random numbers of claim 5, wherein said step of generating chaotic noise comprises the step of:

generating turbulent air flow.

12. The method for generating a multiplicity of random numbers of claim 11, wherein said step of generating turbulent air flow comprises the step of:

operating a fan for generating said turbulent air flow.

13. The method for generating a multiplicity of random numbers of claim 12, wherein said step of sampling is performed at a lower frequency than said fan operates.

14. The method for generating a multiplicity of random numbers of claim 5, wherein said further comprising the steps of:

selecting a first group of bytes from said random digital data stream, said first group of bytes having a first numerical value, respectively;

looking up a first maximal length LFSR feedback term from a list in response to said first numerical value;

generating a cyclic redudancy code feedback term in response to filtering out predetermined values from a third group of bytes selected from said random digital data stream; and forming a secret identification number from said first maximal length LFSR feedback term, said cyclic redudancy code feedback term, and a fourth group of bytes from said random digital data stream.

15. The method for generating a multiplicity of random numbers of claim 14, wherein said step of generating a cyclic redudancy code feedback term comprises the step:

examing whether said cyclic redundancy code feedback term comprises less than two "0" bits or "1" bits; and generating a replacement feedback term for said cyclic redundancy code feedback term if said cyclic redundancy code feedback term comprises less than two "0" bits or "1" bits.

16. The method for generating a multiplicity of random numbers of claim 14, further comprising the steps of:

selecting a second group of bytes from the random digital data stream, said second group of bytes having a second numerical value; and looking up a second maximal length LFSR feedback term from a list in response to said second numerical value such that said secret identification number is formed from said first and second maximal length LFSR feedback terma, said cyclic redundancy code feedback term, and a fourth group of bytes from said random digital data stream.

17. The method for generating a multiplicity of random numbers of claim 16, further comprising the steps of:

repeating the steps of randomly selecting a first and a second group of bytes, looking up a first maximal length LFSR feedback term, looking up a second maximal length LFSR feedback term, generating a cyclic redudancy code feedback term, N times to create N secret identification numbers;

one way encrypting each of said N secret identification numbers;

computing a secure digest of each one way encrypted secret identification number of said N secret identification numbers;

comparing each one way encrypted secret identification number of said N secret identification numbers within said digest; and discarding each one way encrypted secret identification number of said multiplicity within said digest when two identical compressed one way encrypted secret identification number are discovered.

18. A process for generating a multipicity of secure random numbers, the process comprising:

generating chaotic noise from turbulent air flow;

sampling said chaotic noise such that a plurality of samples are created;

converting said plurality of samples into a random digital data stream;

shuffling said plurality of converted samples to obscure correlations between the multiplicity of random numbers;

compressing said shuffled plurality of converted samples such that each random number of the mulitplicity has an equal probability of being generated; and one way encrypting said compressed plurality of shuffled and converted samples such that the plurality of secure random numbers are created.

19. The process for generating a multiplicity of secure random numbers of claim 18, wherein said step of shuffling said digital data set comprises the step of:

positioning each converted sample of said plurality into a data array using a stride to reduce sampling correlations resulting from said sampling of said chaotic noise.

20. The process for generating a multiplicity of secure random numbers of claim 19, wherein said array comprises a width, said stride comprises a size, said width and said size being a prime number.

21. The process for generating a multiplicity of secure random numbers of claim 18, wherein said step of compressing said shuffled plurality of converted samples comprises the step of:

Huffman encoding said shuffled plurality of converted samples; or

PKZIP compressing said shuffled plurality of converted samples; or

UNIX compressing said shuffled plurality of converted samples.

22. The process for generating a multiplicity of secure random numbers of claim 18, wherein said step of one way encrypting said compressed plurality of shuffled and converted samples comprises the step of:

MD-2 encrypting said compressed plurality of shuffled and converted samples; or

MD-4 encrypting said compressed plurality of shuffled and converted samples; or

MD-5 encrypting said compressed plurality of shuffled and converted samples; or

SHA encrypting said compressed plurality of shuffled and converted samples; or

SNEFRU encrypting said compressed plurality of shuffled and converted samples.

23. The process for generating a multiplicity of secure random numbers of claim 18, further comprising the step of:

examining each encrypted sample of said plurality for a duplicate encrypted sample; and discarding said duplicate encrypted sample to insure the uniqueness of each random number of the plurality.

24. The process for generating a multiplicity of secure random numbers of claim 18, further comprising the step of:

exclusively ORing an independent perspective marker with said compressed plurality of shuffled and converted samples to insure the randomness of the multiplicity of random numbers.

25. The process for generating a multiplicity of secure random numbers of claim 24, wherein said independent perspective marker comprises a time of day stamp.

26. The process for generating a multiplicity of secure random numbers of claim 18, wherein said step of generating chaotic noise from turbulent air flow comprises the step of:

operating a fan for generating said turbulent air flow.

27. The process for generating a multiplicity of secure random numbers of claim 24, wherein said step of sampling is performed at a lower frequency than said fan operates.

28. The process for generating a multiplicity of secure random numbers of claim 18, further comprising the steps of:

randomly selecting a first and a second group of bytes from said random digital data stream, said first and second groups of bytes having a first and a second numerical value, respectively;

looking up a first maximal length LFSR feedback term from a list according to said first numerical value;

looking up a second maximal length LFSR feedback term from said list according to said second numerical value;

generating a cyclic redudancy code feedback term in response to executing a cyclic redudancy code check on a third group of bytes selected from said random digital data stream; and forming a secret identification number from said first and second maximal length LFSR feedback terms, said cyclic redundancy code feedback term, and a fourth group of bytes from said random digital data stream.

29. The process for generating a multiplicity of secure random numbers of claim 28, wherein said step of generating a cyclic redudancy code feedback term comprises the steps of:

examing whether said cyclic redundancy code feedback term comprises less than two "0" bits or "1" bits; and generating a replacement feedback term for said cyclic redundancy code feedback term if said cyclic redundancy code feedback term comprises less than two "0" bits or "1" bits.

30. The process for generating a multiplicity of secure random numbers of claim 28, further comprising the steps of:

repeating the steps of randomly selecting a first and a second group of bytes, looking up a first maximal length LFSR feedback term, looking up a second maximal length LFSR feedback term, generating a cyclic redundancy code feedback term, N times to create N secret identification numbers;

one way encrypting each of said N secret identification numbers;

computing a secure digest of each one way encrypted secret identification number of said N secret identification numbers;

comparing each one way encrypted secret identification number of said N secret identification numbers within said digest; and discarding each one way encrypted secret identification number of said multiplicity within said digest when two identical compressed one way encrypted secret identification number are discovered.

* * * * *